(12) United States Patent
Lee et al.

(10) Patent No.: US 10,377,577 B2
(45) Date of Patent: Aug. 13, 2019

(54) TABLET SUPPLY APPARATUS

(71) Applicant: ENCLONY INC, Seoul (KR)

(72) Inventors: Kyung-Ho Lee, Seoul (KR); Byung-In Kim, Seoul (KR)

(73) Assignee: ENCLONY INC, Seoul (KR)

( * ) Notice: Subject to any disclaimer, the term of this patent is extended or adjusted under 35 U.S.C. 154(b) by 0 days.

(21) Appl. No.: 15/567,136

(22) PCT Filed: Apr. 14, 2016

(86) PCT No.: PCT/KR2016/003892
§ 371 (c)(1),
(2) Date: Oct. 17, 2017

(87) PCT Pub. No.: WO2016/167569
PCT Pub. Date: Oct. 20, 2016

(65) Prior Publication Data
US 2018/0105369 A1    Apr. 19, 2018

(30) Foreign Application Priority Data

Apr. 17, 2015 (KR) ........................ 10-2015-0054637

(51) Int. Cl.
*B65G 47/14* (2006.01)
*B65G 47/24* (2006.01)
(Continued)

(52) U.S. Cl.
CPC ......... *B65G 47/24* (2013.01); *B65G 47/1464* (2013.01); *B65G 47/80* (2013.01); *G01B 11/24* (2013.01); *B65G 2201/027* (2013.01)

(58) Field of Classification Search
CPC ............ B65G 47/1428; B65G 47/1435; B65G 47/1442; B65G 47/1457; B65G 47/1464
(Continued)

(56) References Cited

U.S. PATENT DOCUMENTS 4,007,854 A  *  2/1977  Ervine ............... B65G 47/1464
                                                    198/392
4,211,248 A  *  7/1980  Lafon ..................... G07D 9/008
                                                    221/186
(Continued)

FOREIGN PATENT DOCUMENTS

JP          5-22416 U       3/1993
JP         11-51873 A       2/1999
(Continued)

OTHER PUBLICATIONS

International Search Report and Written Opinion for corresponding Patent Application No. PCT/KR2016/003892 dated Jul. 25, 2016.
(Continued)

*Primary Examiner* — William R Harp
(74) *Attorney, Agent, or Firm* — Renner, Otto, Boisselle & Sklar, LLP

(57) ABSTRACT

A tablet supply apparatus includes: a base frame; a rotary plate rotatably installed on the base frame to outwardly position a tablet by centrifugal force, and inclinedly positioned to have a top dead center point and a bottom dead center point; a transfer plate positioned to surround the rotary plate, rotated with the rotary plate, and having an inclined surface outwardly and downwardly inclined on the same level as that of the top dead center point of the rotary plate, in order to receive the tablet from the top dead center point of the rotary plate; and a guide unit disposed on the outer peripheral surface of the transfer plate, the guide unit allowing the tablet, positioned and transferred on the inclined surface of the transfer plate, to be discharged toward the rotary plate of the inspection unit by centrifugal force and a sliding movement.

19 Claims, 10 Drawing Sheets

(51) Int. Cl.
*G01B 11/24* (2006.01)
*B65G 47/80* (2006.01)

(58) Field of Classification Search
USPC .................................... 198/382, 396, 443
See application file for complete search history.

(56) References Cited

U.S. PATENT DOCUMENTS

| | | | | |
|---|---|---|---|---|
| 4,429,808 | A * | 2/1984 | Doty | B65G 47/1457 |
| | | | | 198/392 |
| 4,938,082 | A * | 7/1990 | Buckley | B07C 5/02 |
| | | | | 198/392 |
| 5,927,467 | A * | 7/1999 | Spatafora | B65G 47/1464 |
| | | | | 198/392 |
| 6,079,284 | A | 6/2000 | Yamamoto et al. | |
| 6,311,825 | B1 * | 11/2001 | Schmitt | B65G 47/1457 |
| | | | | 198/392 |
| 6,578,699 | B2 * | 6/2003 | Baird | B65G 47/1457 |
| | | | | 198/392 |
| 7,472,782 | B2 * | 1/2009 | Corbin | B65G 47/1457 |
| | | | | 198/392 |
| 8,074,782 | B2 * | 12/2011 | Charpentier | B29C 49/4205 |
| | | | | 198/396 |
| 8,827,112 | B2 * | 9/2014 | Yuyama | A61J 7/02 |
| | | | | 221/237 |
| 9,038,816 | B2 | 5/2015 | Koike et al. | |
| 9,155,681 | B2 | 10/2015 | Yuyama et al. | |

FOREIGN PATENT DOCUMENTS

| | | |
|---|---|---|
| JP | 2010-503589 A | 2/2010 |
| KR | 10-2009-0095687 A | 9/2009 |
| KR | 10-1216534 B1 | 12/2012 |
| KR | 10-2013-0112944 A | 10/2013 |
| KR | 10-2013-0139865 A | 12/2013 |
| KR | 10-2014-0070077 A | 6/2014 |

OTHER PUBLICATIONS

Japanese Office Action in corresponding Patent Application No. JP 2018-506065 dated Nov. 6, 2018.

* cited by examiner

TABLET SUPPLY APPARATUS

TECHNICAL FIELD

The present disclosure related to a tablet supply apparatus, and more particularly, to a tablet supply apparatus that may easily supply tablets to a rotary plate of an inspection unit by centrifugal force.

BACKGROUND ART

Inn general, since tablets are mass produced through an automated process, a large amount of unsatisfactory tablets may occur in a discharges process, rather than the occurrence of defects caused due to components or dosages thereof.

Accordingly, a process of inspecting defects in tablet appearance, such as the attachment of, or tablet pollution by, foreign substances, cracking or partial damage through contact or impacts between tablets, deformations or printing defects, has been required.

A process of inspecting an appearance of a tablet having a capsular, elliptical, or circular cross-sectional shape is moving away from visual inspections performed by workers to automatic testing using an automatic testing apparatus. Various types of automatic test apparatuses for automatic testing have been proposed.

When automatically inspecting tablets using an automatic test apparatus, a method of determining the presence and absence of defects in an appearance of a tablet through capturing an image of one side of the tablet, using a camera, while transferring the tablet, capturing an image of the other side of the tablet, using the camera, while transferring the tablet with its position reversed, and processing the captured images has been adopted.

Japanese Patent Laid-open Publication No. Hei. 11-51873 discloses an example of the technology described above. This relates to an apparatus for inspecting an appearance of a tablet, in which a holding groove or an accommodation groove is formed around a transfer drum at a predetermined interval to hold tablets. The apparatus may be required to allow a supply unit to supply tablets at a constant speed and interval, in order to supply the tablets to the holding groove formed around the transfer drum at the predetermined interval.

Thus, it may be difficult to accurately control the rotation speed of the transfer drum and the speed and interval of the supply unit. In particular, it may be difficult to vary an inspection speed according to tablet shapes or inspection difficulties.

DISCLOSURE

Technical Problem

The purpose of the present disclosure is to provide a tablet supply apparatus that may easily supply tablets to a rotary plate of an inspection unit by centrifugal force without considering tablet supply speed and interval.

Technical Solution

According to an aspect of the present disclosure, a tablet supply apparatus may include: a base frame; a rotary plate rotatably installed on the base frame to outwardly position a tablet by centrifugal force, and inclinedly disposed to have a top dead center point and a bottom dead center point; a transfer plate disposed to surround the rotary plate, rotated with the rotary plate, and having an inclined surface outwardly and downwardly inclined on the same level as that of the top dead center point of the rotary plate, in order to receive the tablet from the top dead center point of the rotary plate; and a guide unit disposed on an outer peripheral surface of the transfer plate, the guide unit allowing the tablet, positioned and transferred on the inclined surface of the transfer plate, to be discharged toward the rotary plate of an inspection unit by centrifugal force and a sliding movement.

The transfer plate may have the inclined surface having an uneven pattern to increase frictional force with respect to the tablet positioned and transferred on the inclined surface.

The guide unit may have one end disposed on a side of the top dead center point of the rotary plate, and the other end disposed on a side of the rotary plate of the inspection unit, the other end having a gap with respect to the inclined surface of the transfer plate.

The guide unit may include a support plate disposed in the gap between the other end and the inclined surface of the transfer plate to support the tablet, such that the tablet may be discharged toward the rotary plate of the inspection unit while sliding to the rotary plate.

Further, the guide unit may have a side surface contacting the tablet transferred on the inclined surface of the transfer plate, the side surface being formed to be perpendicular to the inclined surface of the transfer plate.

The tablet supply apparatus may further include a guide cover installed on the guide unit to have a gap with respect to the inclined surface of the transfer plate.

The guide cover may have a surface opposing the inclined surface of the transfer plate, the surface being formed to be parallel to the inclined surface of the transfer plate.

Further, the guide cover may be lifted up and down in response to a thickness of a tablet transferred on the inclined surface of the transfer plate.

The guide cover may include: a first guide cover installed on a side on which the tablet may be introduced to the inclined surface of the transfer plate; and a second guide cover installed on a side on which the tablet, transferred on the inclined surface of the transfer plate, may be discharged toward the rotary plate of the inspection unit.

The second guide cover may include an inversion prevention unit preventing the tablet from being inverted at a time at which the tablet may be transferred from the inclined surface of the transfer plate to the rotary plate of the inspection unit.

The inversion prevention unit may protrude toward an upper side of the rotary plate of the inspection unit on one end of the second guide cover, and may have a surface opposing the rotary plate of the inspection unit, the surface being formed to be parallel to the rotary plate of the inspection unit.

Further, the second guide cover may include a jamming prevention unit installed on an end of the transfer plate to which the tablet, transferred on the inclined surface of the transfer plate, may be introduced, the jamming prevention unit preventing the tablet from being jammed at the end.

The jamming prevention unit may include: a moving member rotatably installed on a side of the second guide cover on which the tablet may be introduced, the moving member being formed to have the same cross section as a cross section of the second guide cover; and an elastic member installed in the second guide cover, the elastic member applying elastic force to the moving member, such that the moving member may be in close contact with the guide unit.

The jamming prevention unit may include: a moving member installed on a side of the second guide cover on which the tablet may be introduced, the moving member sliding parallel to the inclined surface of the transfer plate; and an elastic member installed in the second guide cover, the elastic member applying elastic force to the moving member, such that the moving member may be in close contact with the guide unit.

Advantageous Effects

A tablet supply apparatus, according to an exemplary embodiment in the present disclosure, has an effect of simplifying the control and structure of a tablet supply apparatus and improving operation speed, as it is possible to easily supply tablets to the rotary plate of the inspection unit by centrifugal force, without considering tablet supply speed and interval.

DESCRIPTION OF DRAWINGS

FIG. 8 is a front view schematically illustrating a jamming prevention unit in a tablet supply apparatus, according to another exemplary embodiment in the present disclosure;

BEST MODE FOR INVENTION

Figure 1:
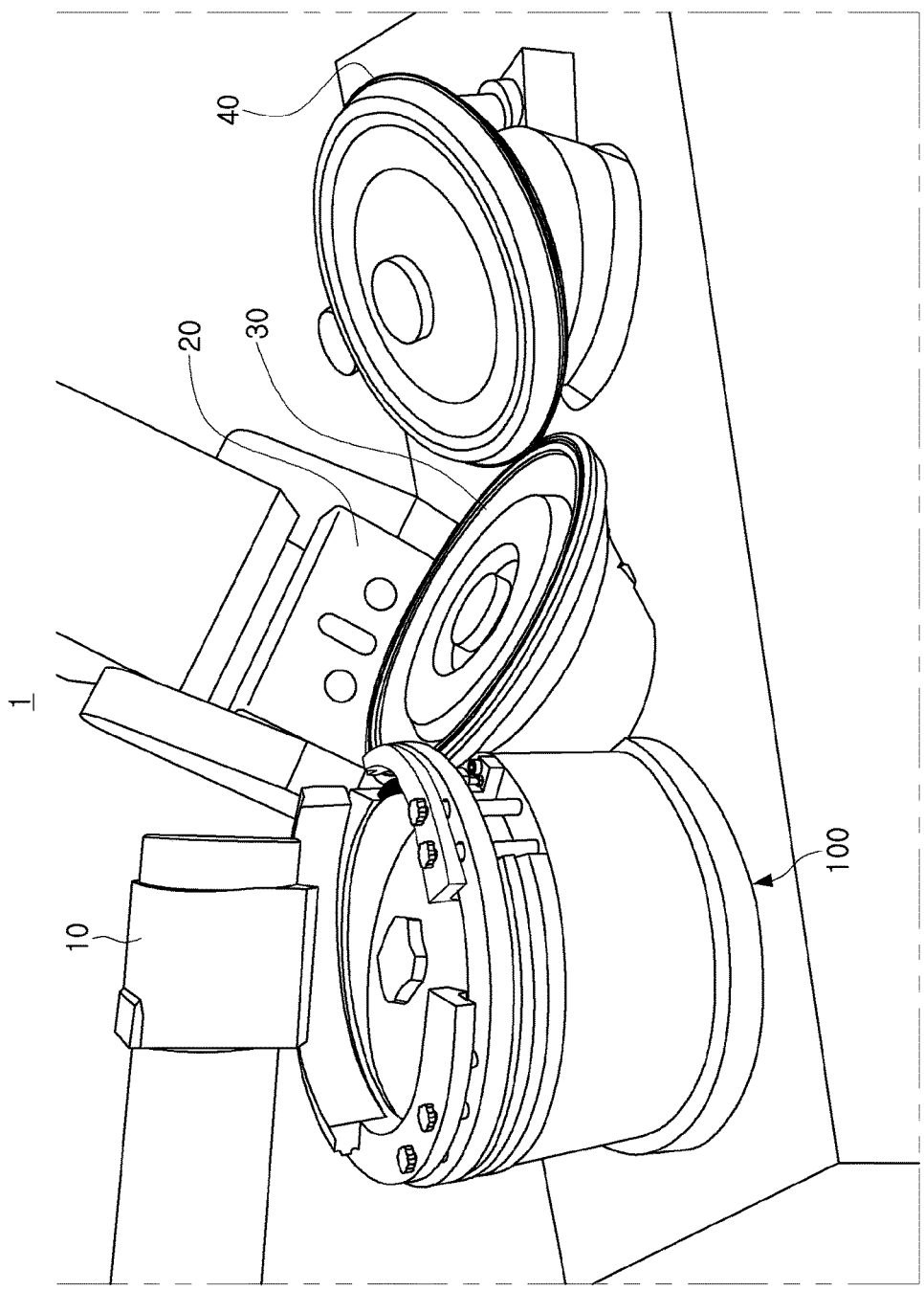
FIG. 1 is a perspective view schematically illustrating a tablet inspection apparatus to which a tablet supply apparatus, according to an exemplary embodiment in the present disclosure, is applied.

To help understand the foregoing features of the present disclosure, a tablet supply apparatus, in relation to an exemplary embodiment in the present disclosure, will be described in more detail.

In the following description, the same elements will be designated by the same reference numerals, even when illustrated in different drawings. Further, in the following description of embodiments of the present disclosure, a detailed description of known configurations or functions incorporated herein will be omitted when it may render the gist of the present disclosure unclear.

Hereinafter, exemplary embodiments in the present disclosure will be described in detail with reference to the accompanying drawings.

FIG. 1 is a perspective view schematically illustrating a tablet inspection apparatus to which a tablet supply apparatus, according to an exemplary embodiment in the present disclosure, is applied.

Referring to FIG. 1, a tablet inspection apparatus 1 may include a tablet supply apparatus 100 arranging tablets, introduced thereinto through a hopper 10, in a row, by centrifugal force, a rotary plate 30 of an inspection unit holding the tablets discharged by the tablet supply apparatus 100 and transferring the tablets, such that the tablets may pass through the inspection unit 20, and a rotary plate 40 of a discharge unit receiving the tablets from the rotary plate 30 of the inspection unit and transferring the tablets, such that the tablets may be divided into satisfactory and unsatisfactory tablets and discharged.

The rotary plate 30 of the inspection unit may include a holding portion in the form of a slot in a circumferential direction, and may hold and transfer the tablets regardless of a supply speed of the tablets and an interval between the tablets. The rotary plate 30 may transfer the tablets, such that the tablets may pass through the inspection unit 20, an imaging device, such as a camera or the like, to determine whether the tablets are defective.

The rotary plate 40 of the discharge unit may be disposed above the rotary plate 30 of the inspection unit in a region of the rotary plate 40, and may hold the tablets passing through the inspection unit 20 from the rotary plate 30 of the inspection unit, divide the tablets into satisfactory and unsatisfactory tablets, and individually discharge the satisfactory and unsatisfactory tablets.

Figure 2:
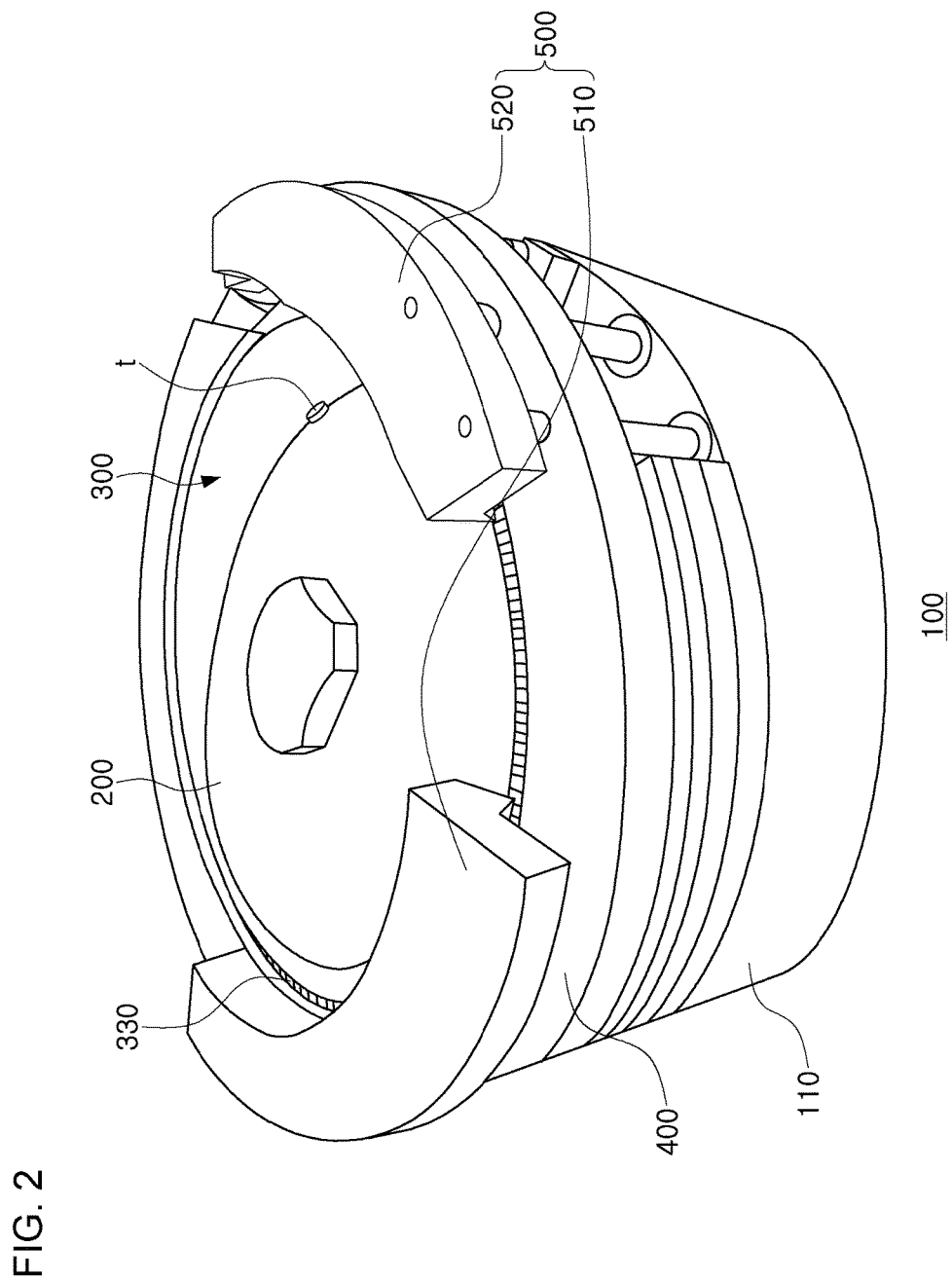
FIG. 2 is a perspective view schematically illustrating a tablet supply apparatus, according to an exemplary embodiment in the present disclosure.
Figure 3:
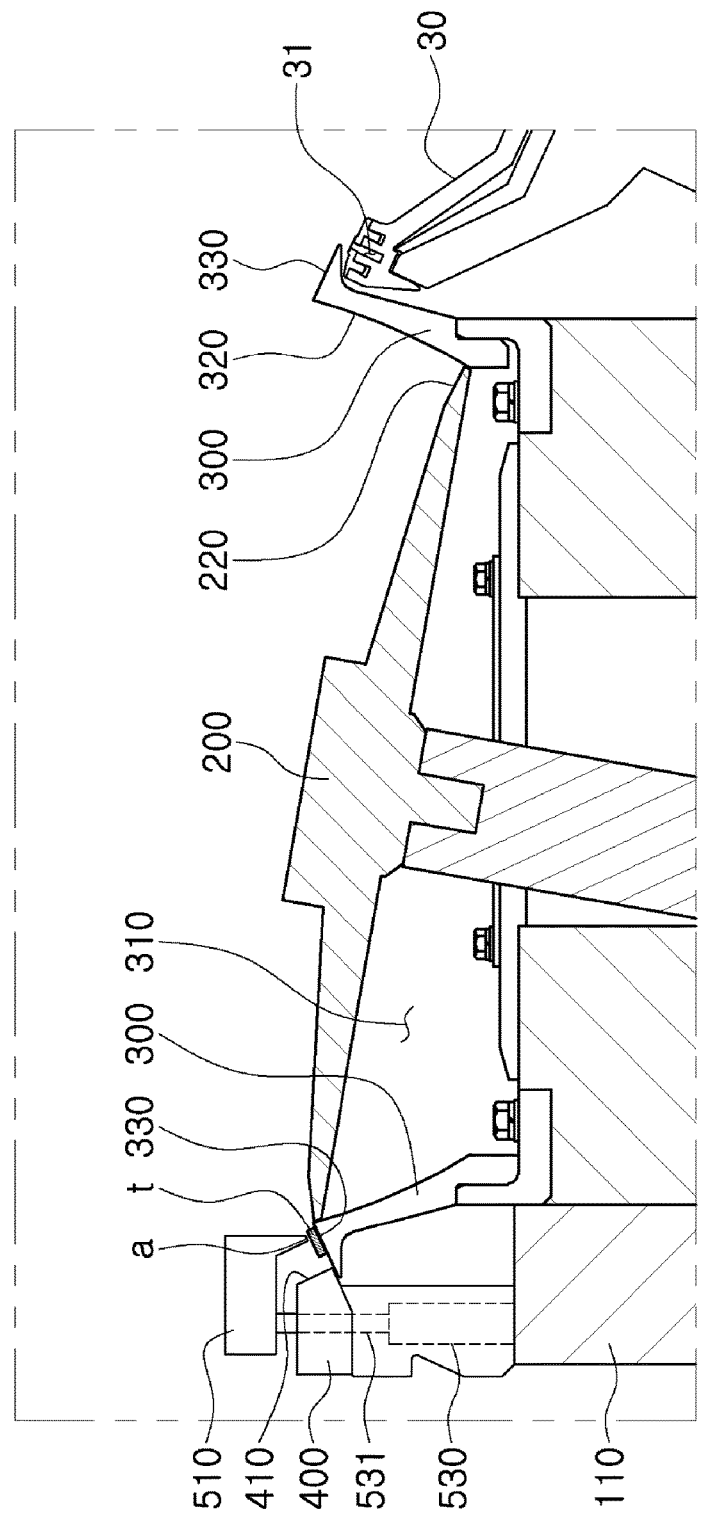
FIG. 3 is a cross-sectional view schematically illustrating a tablet supply apparatus, according to an exemplary embodiment in the present disclosure.
Figure 4:
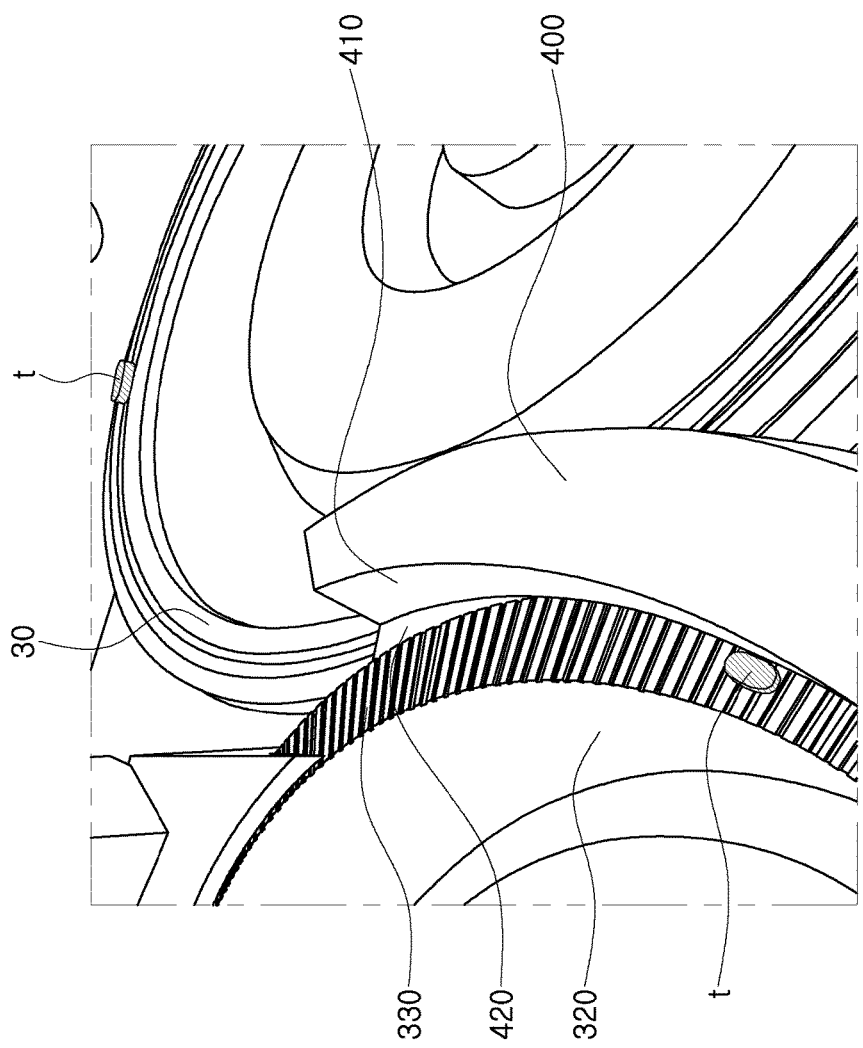
FIG. 4 is a perspective view schematically illustrating a side of a tablet supply apparatus, according to an exemplary embodiment in the present disclosure, on which tablets may be introduced.
Figure 5:
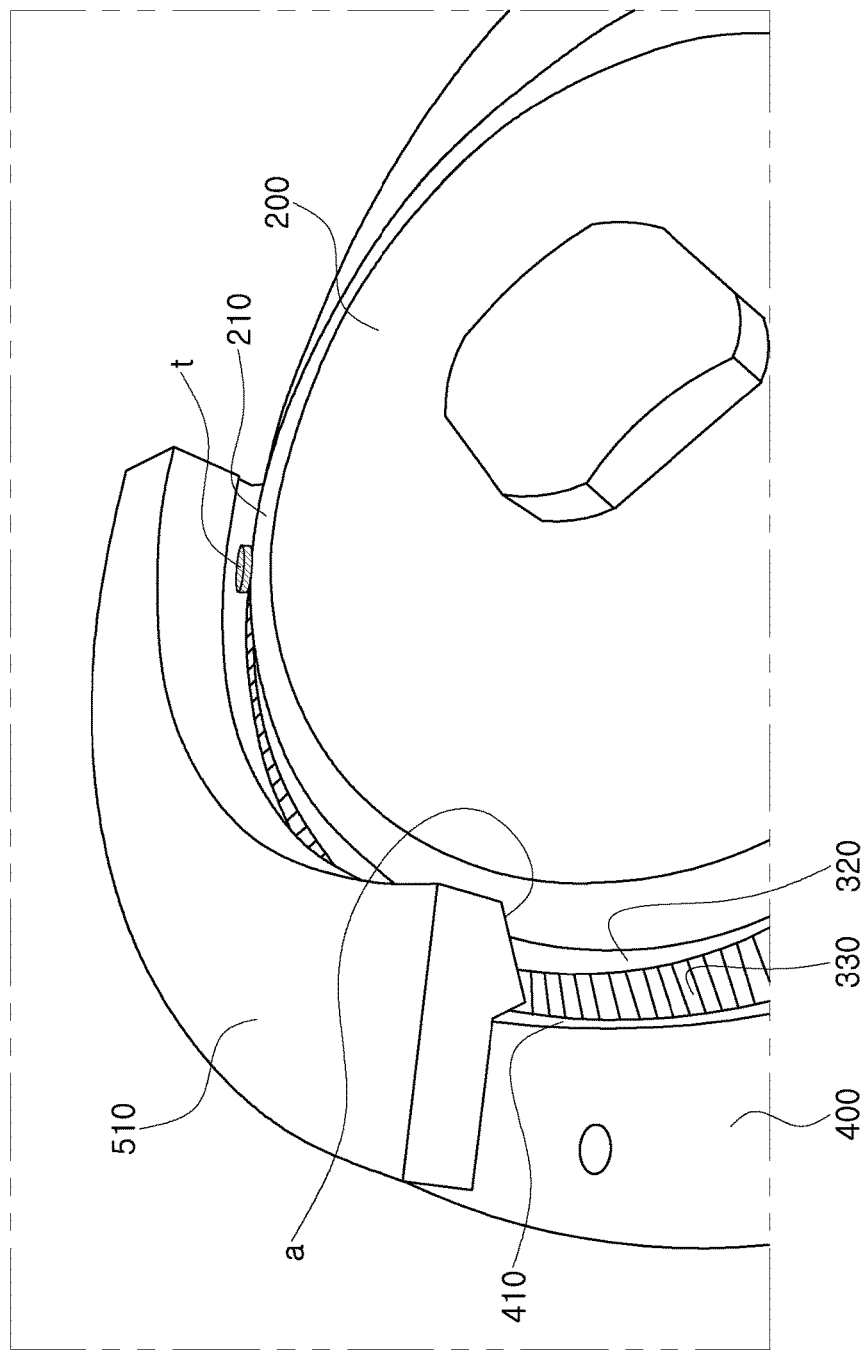
FIG. 5 is a perspective view schematically illustrating a side of a table supply apparatus, according to an exemplary embodiment in the present disclosure, on which tablets may be discharged.

FIG. 2 is a perspective view schematically illustrating a tablet supply apparatus, according to an exemplary embodiment in the present disclosure. FIG. 3 is a cross-sectional view schematically illustrating the tablet supply apparatus. FIG. 4 is a perspective view schematically illustrating a side of the tablet supply apparatus on which tablets may be introduced. FIG. 5 is a perspective view schematically illustrating a side of the tablet supply apparatus on which tablets may be discharged.

Referring to FIGS. 2 through 5, a tablet supply apparatus 100, according to an exemplary embodiment in the present disclosure, may include a base frame 110, a rotary plate 200 rotatably installed on the base frame 110 to outwardly position a tablet t by centrifugal force and inclinedly installed to have a top dead center point 210 and a bottom dead center point 220, a transfer plate 300 disposed to surround the rotary plate 200, rotated with the rotary plate 200, and having an inclined surface 330 outwardly and downwardly inclined on the same level as that of the top dead center point 210 of the rotary plate 200 to receive the tablet t from the top dead center point 210 of the rotary plate 200, and a guide unit 400 disposed on an outer peripheral surface of the transfer plate 300 and allowing the tablet t, positioned and transferred on the inclined surface 330 of the transfer plate 300, to be discharged toward a rotary plate 30 of an inspection unit by centrifugal force and a sliding movement.

The rotary plate 200 may be provided in the form of a disk, may be rotatably installed on the base frame 220 to outwardly position the tablet t, supplied from the hopper 10 (refer to FIG. 1), by centrifugal force, and may be inclinedly disposed to have the top dead center point 210 and the bottom dead center point 220 to move the tablet t, piled at the bottom dead center point 220, to the top dead center point 210.

That is, the rotary plate 200 may be disposed on the base frame 110 to have a slope, so that the tablet t, supplied from the hopper 10 (refer to FIG. 1), may be rotated to the bottom dead center point 220. When the rotary plate 200 is rotated, the centrifugal force may cause the tablet t to be moved outwardly of the rotary plate 200 to be positioned in a row, and to be moved from the top dead center point 210 to the inclined surface 330 of the transfer plate 300 by centrifugal force, and by a sliding movement due to the inclined surface 330 of the transfer plate 300.

The transfer plate 300 may be provided in the form of a cylinder having a hollow portion 310, and the rotary plate 200 may be disposed in the hollow portion 310 to surround the rotary plate 200.

The transfer plate 300 may be rotated with the rotary plate 200 to allow the tablet t, transferred by the centrifugal force of the rotary plate 200, to be moved from the bottom dead center point 220 of the rotary plate 200 to the top dead center point 210 on an inner surface 320 of the hollow portion 310. At this time, the tablet t, moved to the top dead center point 210 of the rotary plate 200, may be moved to the inclined surface 330 outwardly and downwardly inclined on the same level as that of the top dead center point 210 of the rotary plate 200.

Further, the transfer plate 300 may have an uneven pattern formed on the inclined surface 330 to increase frictional force with respect to the tablet t positioned and transferred on the inclined surface 330.

Here, it may be preferable that the inclined surface 330 be set to have an angle range in which the tablet t may easily slide.

The guide unit 400 may be disposed on the outer peripheral surface of the transfer plate 300 to allow the tablet t, supplied from the top dead center point 210 of the rotary plate 200, to be positioned in a row and transferred without escaping externally of the inclined surface 330 of the transfer plate 300, and to allow the transferred tablet t to be discharged toward the rotary plate 30 of the inspection unit by centrifugal force.

Here, the guide unit 400 may preferably have one end disposed on a side of the top dead center point 210 of the rotary plate 200, and the other end disposed on a side of the rotary plate 30 of the inspection unit while having a gap with respect to the inclined surface 330 of the transfer plate 300.

Referring to FIG. 4, the guide unit 400 may further include a support plate 420 disposed in the gap between the other end and the inclined surface 330 of the transfer plate 300 to support the tablet t, such that the tablet t may be discharged toward the rotary plate 30 of the inspection unit while sliding to the rotary plate 200. Here, FIG. 4 is a view from which a second guide cover 520, fastened to the guide unit 400, is omitted, to clearly understand the support plate 420.

The support plate 420 may allow the tablet t to be stably seated on the rotary plate 30 of the inspection unit. In the rotary plate 30 of the inspection unit, a holding portion 31 may be provided in the form of a slot to hold and transfer the tablet t discharged through the support plate 420.

The support plate 420 may allow the tablet t to be stably seated on the rotary plate 30 of the inspection unit. In the rotary plate 30 of the inspection unit, a holding portion 31 may be provided in the form of a slot to hold and transfer the tablet t discharged through the support plate 420.

The guide unit 400 may preferably be formed to have a side surface 410, contacting the tablet t, transferred on the inclined surface 330 of the transfer plate 300, formed to be perpendicular to the inclined surface 330 of the transfer plate 300, in order to allow the transferred tablet t to be more stably transferred without being damaged.

The tablet supply apparatus 100, according to an exemplary embodiment in the present disclosure, may further include a guide cover 500 installed on the guide unit 400 to have a predetermined gap with respect to the inclined surface 330 of the transfer plate 300. That is, the guide cover 500 may preferably have the gap, such that the tablet t, transferred on the inclined surface 330 of the transfer plate 300, may pass therethrough. The guide cover 500 may prevent passage of a tablet in an abnormal state, such as a plurality of tablets t adhering to each other or being agglomerated, or a tablet t entering in an upright position.

The guide cover 500 may preferably be formed to have a surface a opposing the inclined surface 330 of the transfer plate 300 and formed to be parallel to the inclined surface 330 of the transfer plate 300.

The guide cover 500 may be provided to be lifted up and down in response to a thickness of the tablet t transferred on the inclined surface 330 of the transfer plate 300. For this purpose, an actuator 530, having a rod 531 linearly moving, may be installed on the base frame 110, and the rod 531 of the actuator 530 may be configured to pass through the guide unit 400 to be fastened to the guide cover 500, lifting the guide cover 500 up and down.

Referring to FIG. 2, the guide cover 500 may be provided with a first guide cover 510 installed on a side on which the tablet t may be introduced to the inclined surface 330 of the transfer plate 300, and the second guide cover 520 installed on a side on which the tablet t, transferred on the inclined surface 330 of the transfer plate 300, may be discharged toward the rotary plate 30 of the inspection unit.

This may be provided to secure space for installing a tablet dropping device (not illustrated) in a region between the first guide cover 510 and the second guide cover 520. The tablet dropping device may be a device dropping any tablet, escaping from the inclined surface 330 of the transfer plate 300 due to misarrangement, among the tablets t transferred on the inclined surface 330 of the transfer plate 300, to the rotary plate 200, such that the tablet t may be transferred in a right direction.

Figure 6:
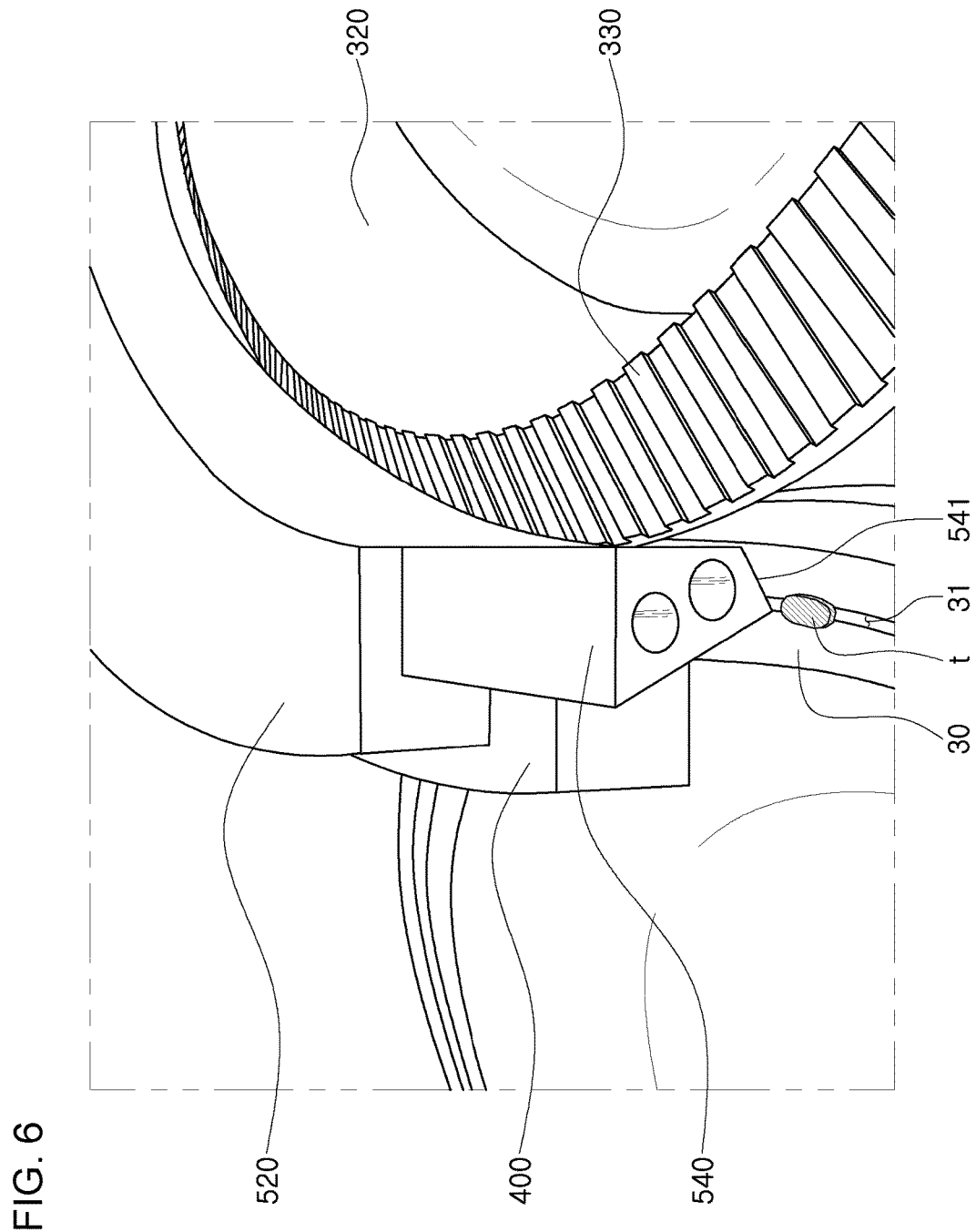
FIG. 6 is a front perspective view schematically illustrating an inversion prevention unit in a tablet supply apparatus, according to an exemplary embodiment in the present disclosure.
Figure 7:
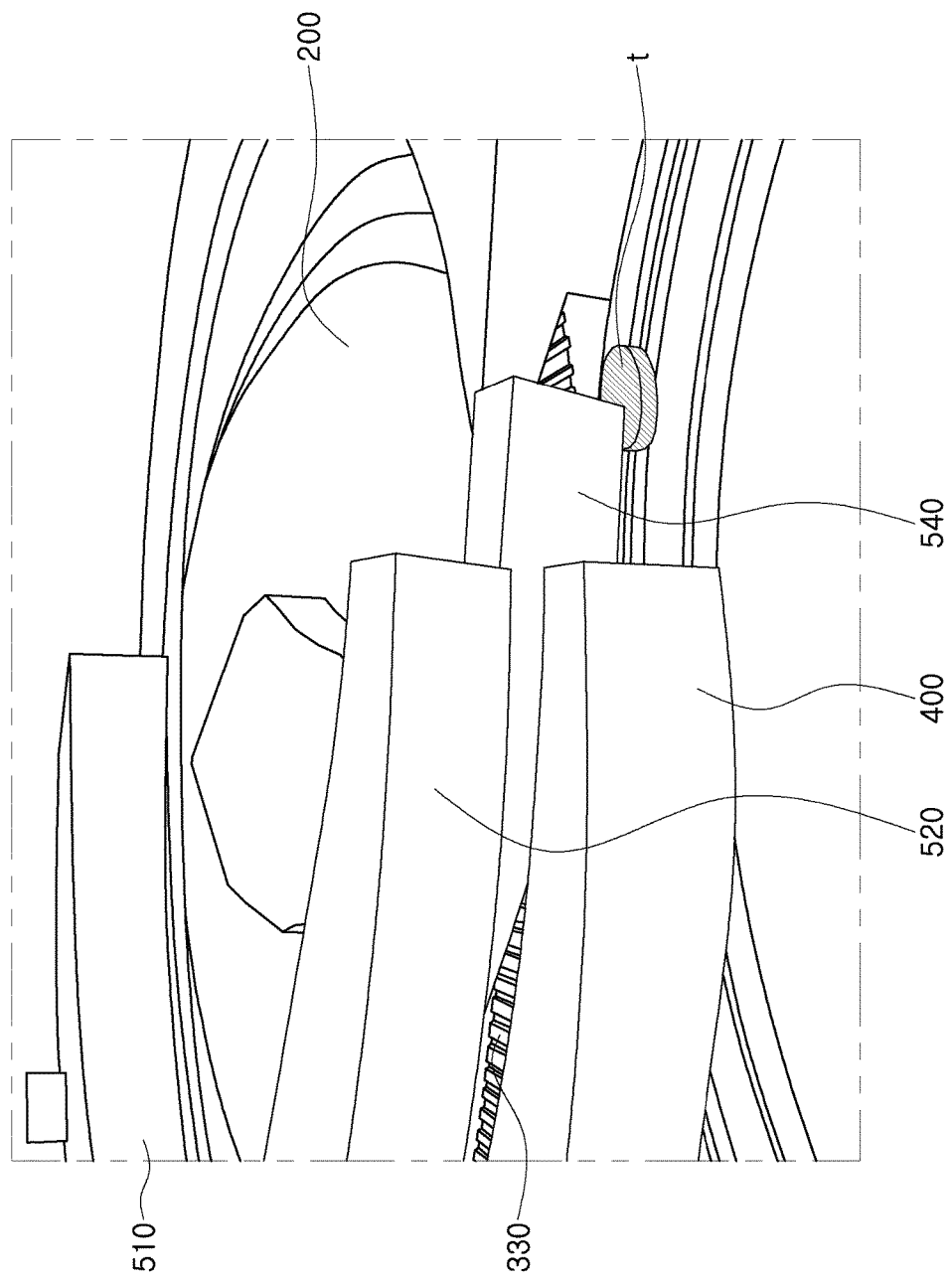
FIG. 7 is a side perspective view schematically illustrating an inversion prevention unit in a tablet supply apparatus, according to an exemplary embodiment in the present disclosure.

FIGS. 6 and 7 are front and side perspective views schematically illustrating an inversion prevention unit in a tablet supply apparatus, according to an exemplary embodiment in the present disclosure.

Referring to FIGS. 6 and 7, the second guide cover 520 may further include an inversion prevention unit 540 preventing a tablet t from being inverted at a time at which the tablet t is transferred from the inclined surface 330 of the transfer plate 300 to the rotary plate 30 of the inspection unit.

It may be preferable that the inversion prevention unit 540 protrude above the rotary plate 30 of the inspection unit on one end of the second guide cover 520, and that a surface 541, opposing the rotary plate 30 of the inspection unit, be formed to be parallel to the rotary plate 30 of the inspection unit.

The rotary plate 30 of the inspection unit may be rotated at a speed faster than that of the transfer plate 300, and thus the tablet t, discharged from the inclined surface 330 of the transfer plate 300 toward the rotary plate 30 of the inspection unit, may be inverted due to an instantaneous speed difference. In order to prevent the inversion of the tablet t, the inversion prevention unit 540 may be formed to extend from the end of the second guide cover 520 and to protrude above the rotary plate 30 of the inspection unit.

Here, it may be preferable that the inversion prevention unit 540 be disposed higher than the thickness of the tablet t and lower than a length of the tablet t, based on the rotary plate 30 of the inspection unit. That is, it may be preferable that a gap between the inversion prevention unit 540 and the rotary plate 30 of the inspection unit be formed in a manner similar to a gap between the inclined surface 330 of the transfer plate 300 and the second guide cover 520.

When a supplied tablet is thicker, the guide cover 500 may be moved upwardly to expand space between the inclined surface 330 of the transfer plate 300 and the guide cover 500. However, in this case, a gap may be formed between the second guide cover 520 and the guide unit 400 on a side of the second guide cover 520 on which a tablet may be introduced, and thus the tablet may be jammed in the gap. A surface of the second guide cover 520 facing the guide unit 400 may be formed to have a slope with respect to a direction of the guide cover 500, and thus the gap may increase toward an upper side of the second guide cover 520. In order to prevent the jamming of the tablet, a jamming prevention unit may be provided.

Figure 8:
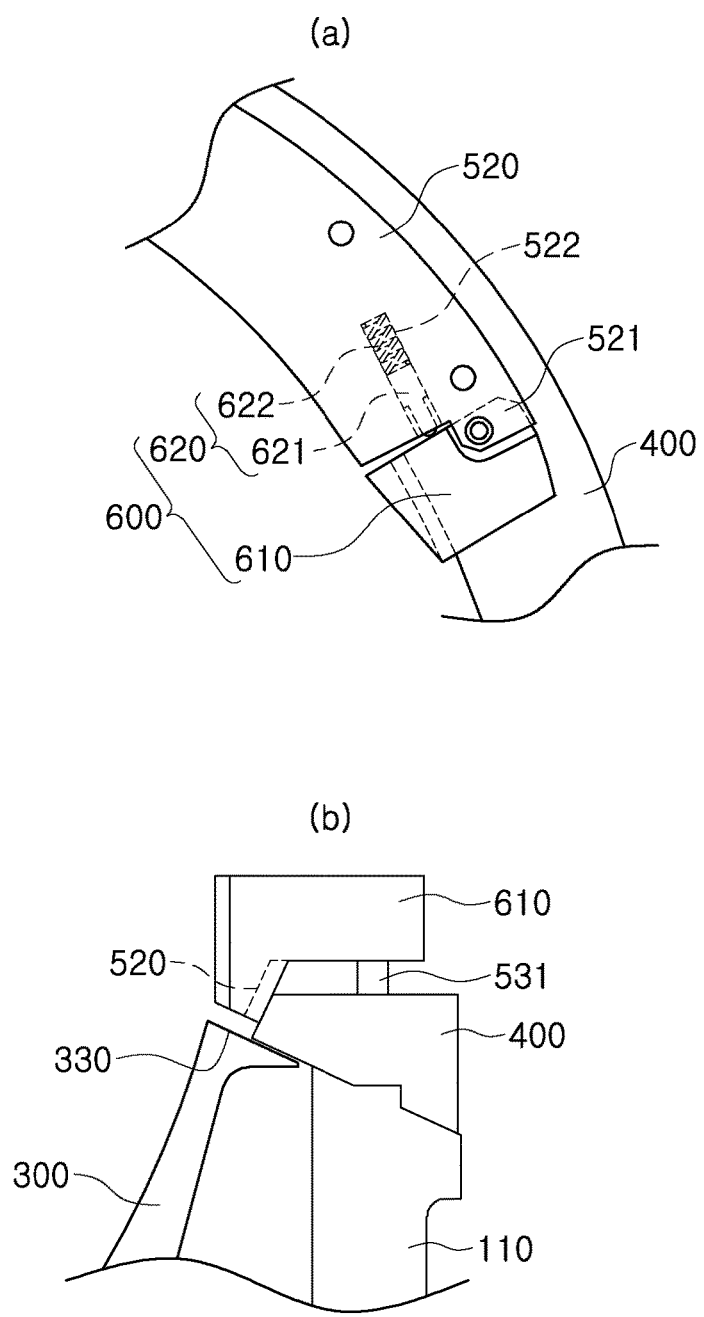
FIG. 8 is a plan view schematically illustrating a jamming prevention unit in a tablet supply apparatus, according to another exemplary embodiment in the present disclosure.

(a), (b) of FIG. 8 are plan and front views, schematically illustrating a jamming prevention unit in a tablet supply apparatus according to another exemplary embodiment in the present disclosure.

Referring to (a), (b) of FIG. 8, the tablet supply apparatus, according to another exemplary embodiment in the present disclosure, may further include a jamming prevention unit 600 installed on an end of the second guide cover 520 on which a tablet t may be introduced to a side of the second guide cover 520, to prevent the tablet t from being jammed at the end of the second guide cover 520 on which the tablet t, transferred on the inclined surface 330 of the transfer plate 300, may be introduced to a side of the second guide cover 520.

The jamming prevention unit 600 may include a moving member 610 rotatably installed on the side of the second guide cover 520 on which the tablet t may be introduced, and formed to have the same cross section as a cross section of the second guide cover 520, and an elastic member 620 installed in the second guide cover 520 and applying elastic force to the moving member 610, such that the moving member 610 may be in close contact with the guide unit 400.

In more detail, the moving member 610 may be formed to have the same cross section as that of the second guide cover 520 in a width direction of the second guide cover 520, may be rotatably fastened to a flange 521 formed to protrude from the second guide cover 520, and may be moved with the second guide cover 520 when the second guide cover 520 moves upwardly and downwardly, to have the same gap as that between the tablet t, transferred on the inclined surface 330 of the transfer plate 300, and the second guide cover 520.

The elastic member 620 may be disposed between the second guide cover 520 and the moving member 610, and may be inserted into a hole 522 formed in the second guide cover 520 to apply elastic force to the moving member 610, such that the moving member 610 may be in close contact with the guide unit 400.

For this purpose, the elastic member 620 may include a pressing protrusion 621 contacting the moving member 610 and provided in the form of a hemisphere, and a spring 622 applying elastic force to the pressing protrusion 621, such that the pressing protrusion 621 may be in close contact with a side of the moving member 610.

With this configuration, even when the second guide cover 520 moves upwardly, the moving member 610 may be constantly in close contact with the guide unit 400 to remove space between the second guide cover 520 and the guide unit 400, thus preventing the tablet t from being jammed in the space.

Figure 9:
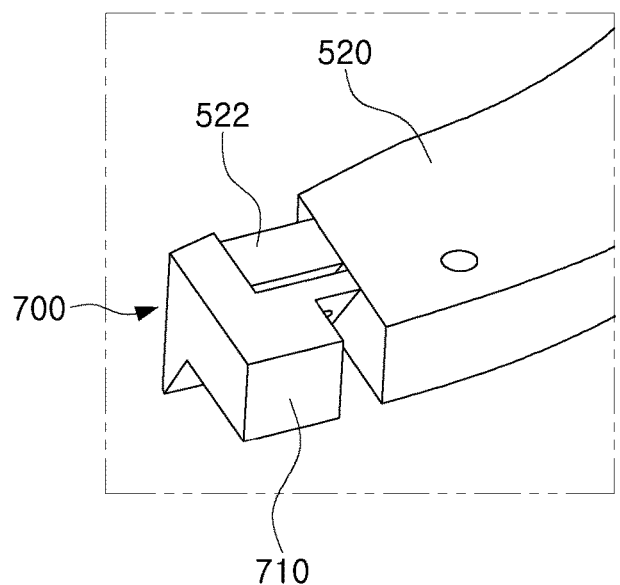
FIG. 9 is a perspective view schematically illustrating a jamming prevention unit in a tablet supply apparatus, according to another exemplary embodiment in the present disclosure.
Figure 10:
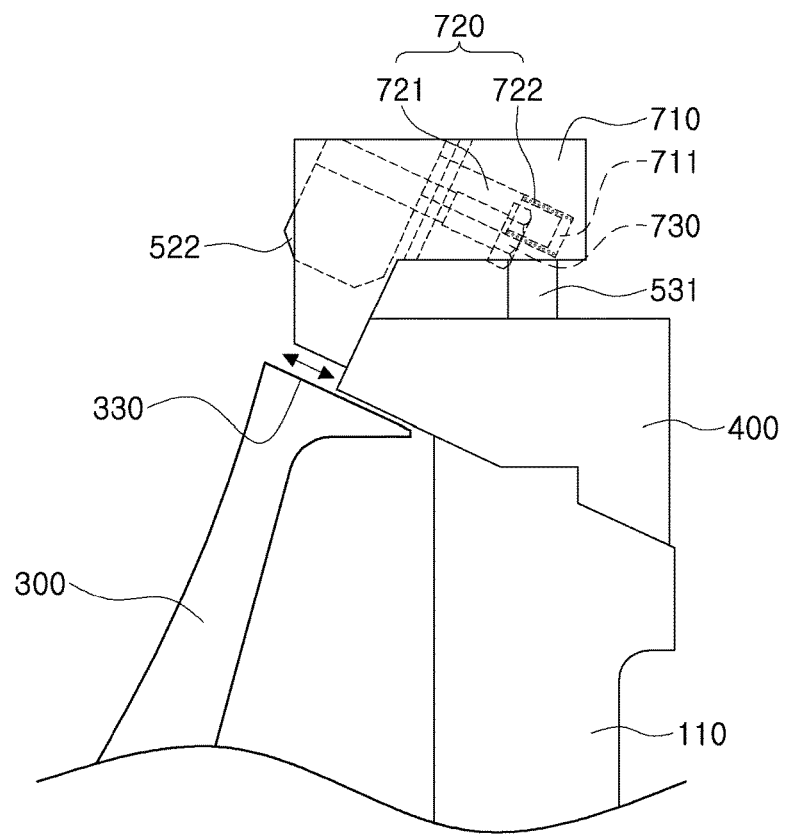
FIG. 10 is a front view schematically illustrating a jamming prevention unit in a tablet supply apparatus, according to another exemplary embodiment in the present disclosure.

FIGS. 9 and 10 are perspective and front views schematically illustrating a jamming prevention unit in a tablet supply apparatus, according to another exemplary embodiment in the present disclosure.

Referring to FIGS. 9 and 10, a jamming prevention unit 700, according to another exemplary embodiment in the present disclosure, may include a moving member 710 installed on a side of the second guide cover 520 on which a tablet may be introduced, and sliding parallel to the inclined surface 330 of the transfer plate 300, and an elastic member 720 installed in the second guide cover 520, and applying elastic force to the moving member 710, such that the moving member 710 may be in close contact with the guide unit 400.

In more detail, the moving member 710 may be formed to have the same cross section as that of the second guide cover 520 in the width direction of the second guide cover 520, and may be fastened to a flange 522, formed to protrude from the second guide cover 520, such that moving member 710 may slide on the flange 522.

The elastic member 720 may include a guide rod 721 having a step formed to protrude from the flange 522 of the second guide cover 520, and a spring 722 fitted to the step of the step of the guide rod 721. At this time, the guide rod 721 may be formed to be parallel to the inclined surface 330 of the transfer plate 300.

The moving member 710 may have a guide hole 711 formed in a side surface thereof facing the flange 522, and the guide rod 721 and the spring 722 may be inserted into the guide hole 711 of the moving member 710. Thus, the moving member 710 may slide along the guide rod 721, and may be in close contact with the guide unit 400 by elastic force of the spring 722. However, a configuration allowing the moving member 710 to slide to the guide unit 400 to be in close contact with the guide unit 400 is not limited thereto, and various mechanical moving methods may be applied.

The jamming prevention unit 700 may further include a stopper 730 preventing the moving member 710 from being completely separated from the flange 522. The stopper 730 may be provided as a bolt having a step, may be inserted into a hole formed in the moving member 710, and may be screwed to the flange 522. The step of the stopper 730 may be formed to be greater than the hole formed in the moving member 710, and may be provided to be spaced apart from the moving member 710 by a predetermined gap.

That is, when the moving member 710 moves in close contact with the guide unit 400, the step of the stopper 730 may be prevented from interfering with the moving member 710, and when the second guide cover 520 is removed from the guide unit 400, the moving member 710 may be supported by the step of the stopper 730 to prevent the moving member 710 from being completely separated from the flange 522.

With this configuration, even when the second guide cover 520 moves upwardly, the moving member 710 may be constantly in close contact with the guide unit 400 to remove space between the second guide cover 520 and the guide unit 400, thus preventing the tablet t from being jammed in the space.

While exemplary embodiments have been shown and described above, it will be apparent to those skilled in the art that modifications and variations could be made without departing from the scope of the present invention, as defined by the appended claims.

The invention claimed is:

1. A tablet supply apparatus, comprising:
a base frame;
a rotary plate rotatably installed on the base frame to outwardly position a tablet by centrifugal force, and inclinedly disposed to have a top dead center point and a bottom dead center point;
a transfer plate disposed to surround the rotary plate, rotated with the rotary plate, and having an inclined surface outwardly and downwardly inclined on the same level as that of the top dead center point of the rotary plate, in order to receive the tablet from the top dead center point of the rotary plate; and
a guide unit disposed on an outer peripheral surface of the transfer plate, the guide unit allowing the tablet, positioned and transferred on the inclined surface of the transfer plate, to be discharged toward a rotary plate of an inspection unit by centrifugal force and a sliding movement,
wherein the guide unit has one end disposed on a side of the top dead center point of the rotary plate, and the other end disposed on a side of the rotary plate of the inspection unit, the other end having a gap with respect to the inclined surface of the transfer plate.

2. The tablet supply apparatus of claim 1, wherein the transfer plate has the inclined surface having an uneven pattern to increase frictional force with respect to the tablet positioned and transferred on the inclined surface.

3. The tablet supply apparatus of claim 1, wherein the guide unit includes a support plate disposed in the gap between the other end and the inclined surface of the transfer plate to support the tablet, such that the tablet is discharged toward the rotary plate of the inspection unit while sliding to the rotary plate.

4. The tablet supply apparatus of claim 1, wherein the guide unit has a side surface contacting the tablet transferred on the inclined surface of the transfer plate, the side surface being formed to be perpendicular to the inclined surface of the transfer plate.

5. The tablet supply apparatus of claim 1, further comprising: a guide cover installed on the guide unit to have a predetermined gap with respect to the inclined surface of the transfer plate.

6. The tablet supply apparatus of claim 5, the guide cover has a surface opposing the inclined surface of the transfer plate, the surface being formed to be parallel to the inclined surface of the transfer plate.

7. The tablet supply apparatus of claim 5, wherein the guide cover is lifted up and down in response to a thickness of the tablet transferred on the inclined surface of the transfer plate.

8. The tablet supply apparatus of claim 7, wherein the guide cover includes: a first guide cover installed on a side on which the tablet is introduced to the inclined surface of the transfer plate; and a second guide cover installed on a side on which the tablet, transferred on the inclined surface of the transfer plate, is discharged toward the rotary plate of the inspection unit.

9. The tablet supply apparatus of claim 8, wherein the second guide cover includes an inversion prevention unit preventing the tablet from being inverted at a time at which the tablet is transferred from the inclined surface of the transfer plate to the rotary plate of the inspection unit.

10. The tablet supply apparatus of claim 9, wherein the inversion prevention unit protrudes toward an upper side of the rotary plate of the inspection unit on one end of the second guide cover, and has a surface opposing the rotary plate of the inspection unit, the surface being formed to be parallel to the rotary plate of the inspection unit.

11. The tablet supply apparatus of claim 8, wherein the second guide cover includes a jamming prevention unit installed on an end of the second guide cover to which the tablet, transferred on the inclined surface of the transfer plate, is introduced, the jamming prevention unit preventing the tablet from being jammed at the end.

12. The tablet supply apparatus of claim 11, wherein the jamming prevention unit includes: a moving member rotatably installed on a side of the second guide cover on which tablet is introduced, the moving member being formed to have the same cross section as a cross section of the second guide cover; and an elastic member installed in the second guide cover, the elastic member applying elastic force to the moving member, such that the moving member is in close contact with the guide unit.

13. The tablet supply apparatus of claim 11, wherein the jamming prevention unit includes: a moving member installed on a side of the second guide cover on which the tablet is introduced, the moving member sliding parallel to the inclined surface of the transfer plate; and an elastic member installed in the second guide cover, the elastic member applying elastic force to the moving member, such that the moving member is in close contact with the guide unit.

14. A tablet supply apparatus, comprising:
a base frame;
a rotary plate rotatably installed on the base frame to outwardly position a tablet by centrifugal force, and inclinedly disposed to have a top dead center point and a bottom dead center point;
a transfer plate disposed to surround the rotary plate, rotated with the rotary plate, and having an inclined surface outwardly and downwardly inclined on the same level as that of the top dead center point of the rotary plate, in order to receive the tablet from the top dead center point of the rotary plate; and
a guide unit disposed on an outer peripheral surface of the transfer plate, the guide unit allowing the tablet, positioned and transferred on the inclined surface of the transfer plate, to be discharged toward a rotary plate of an inspection unit by centrifugal force and a sliding movement,
wherein the guide unit has a side surface contacting the tablet transferred on the inclined surface of the transfer plate, the side surface being formed to be perpendicular to the inclined surface of the transfer plate.

15. A tablet supply apparatus, comprising:
a base frame;
a rotary plate rotatably installed on the base frame to outwardly position a tablet by centrifugal force, and inclinedly disposed to have a top dead center point and a bottom dead center point;
a transfer plate disposed to surround the rotary plate, rotated with the rotary plate, and having an inclined surface outwardly and downwardly inclined on the same level as that of the top dead center point of the rotary plate, in order to receive the tablet from the top dead center point of the rotary plate;

a guide unit disposed on an outer peripheral surface of the transfer plate, the guide unit allowing the tablet, positioned and transferred on the inclined surface of the transfer plate, to be discharged toward a rotary plate of an inspection unit by centrifugal force and a sliding movement; and a guide cover installed on the guide unit to have a predetermined gap with respect to the inclined surface of the transfer plate, wherein the guide cover is lifted up and down in response to a thickness of the tablet transferred on the inclined surface of the transfer plate, and wherein the guide cover includes: a first guide cover installed on a side on which the tablet is introduced to the inclined surface of the transfer plate; and a second guide cover installed on a side on which the tablet, transferred on the inclined surface of the transfer plate, is discharged toward the rotary plate of the inspection unit.

16. The tablet supply apparatus of claim 15, wherein the second guide cover includes an inversion prevention unit preventing the tablet from being inverted at a time at which the tablet is transferred from the inclined surface of the transfer plate to the rotary plate of the inspection unit.

17. The tablet supply apparatus of claim 16, wherein the inversion prevention unit protrudes toward an upper side of the rotary plate of the inspection unit on one end of the second guide cover, and has a surface opposing the rotary plate of the inspection unit, the surface being formed to be parallel to the rotary plate of the inspection unit.

18. The tablet supply apparatus of claim 15, wherein the second guide cover includes a jamming prevention unit installed on an end of the second guide cover to which the tablet, transferred on the inclined surface of the transfer plate, is introduced, the jamming prevention unit preventing the tablet from being jammed at the end.

19. The tablet supply apparatus of claim 18, wherein the jamming prevention unit includes: a moving member rotatably installed on a side of the second guide cover on which tablet is introduced, the moving member being formed to have the same cross section as a cross section of the second guide cover; and an elastic member installed in the second guide cover, the elastic member applying elastic force to the moving member, such that the moving member is in close contact with the guide unit.

* * * * *